US011415811B2

(12) United States Patent
Zheng et al.

(10) Patent No.: US 11,415,811 B2
(45) Date of Patent: Aug. 16, 2022

(54) OPTICAL DEVICE

(71) Applicant: Lenovo (Beijing) Co., Ltd., Beijing (CN)

(72) Inventors: Xiaopan Zheng, Beijing (CN); Chenggang Zou, Beijing (CN); Xiangbo Lv, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 144 days.

(21) Appl. No.: 16/728,837

(22) Filed: Dec. 27, 2019

(65) Prior Publication Data

US 2020/0209641 A1 Jul. 2, 2020

(30) Foreign Application Priority Data

Dec. 29, 2018 (CN) .......................... 201811653759.4

(51) Int. Cl.
*G02B 27/28* (2006.01)
*G02B 27/01* (2006.01)
*G02B 5/30* (2006.01)
*G02F 1/1335* (2006.01)
*G02F 1/13363* (2006.01)

(52) U.S. Cl.
CPC ......... *G02B 27/286* (2013.01); *G02B 5/3083* (2013.01); *G02B 27/0172* (2013.01); *G02B 27/283* (2013.01); *G02F 1/13363* (2013.01); *G02F 1/133536* (2013.01); *G02F 1/133638* (2021.01); *G02F 2201/34* (2013.01)

(58) Field of Classification Search
CPC .............. G02B 27/0101; G02B 27/286; G02B 27/017; G02B 27/0172; G02B 27/283; G02B 27/01; G02B 5/3083; G02F 1/133536; G02F 2001/133638
USPC .......................................................... 353/20
See application file for complete search history.

(56) References Cited

U.S. PATENT DOCUMENTS

| 5,383,053 A * | 1/1995 | Hegg ................. G02B 27/0101 |
| | | 359/485.05 |
| 5,408,053 A * | 4/1995 | Young .................... H01P 3/088 |
| | | 174/262 |
| 2008/0079903 A1* | 4/2008 | DiZio .................. G02B 27/283 |
| | | 353/20 |
| 2017/0255017 A1 | 9/2017 | Haseltine |
| 2018/0120567 A1* | 5/2018 | Cobb ................... G02B 27/283 |
| 2018/0324332 A1* | 11/2018 | Konttori ............. H04N 13/156 |

FOREIGN PATENT DOCUMENTS

| CN | 102253497 A | 11/2011 |
| CN | 107422480 A | 12/2017 |
| CN | 107589546 A | 1/2018 |
| CN | 108241212 A | 7/2018 |
| CN | 108681073 A | 10/2018 |
| CN | 108897136 A | 11/2018 |

* cited by examiner

*Primary Examiner* — William C. Dowling
(74) *Attorney, Agent, or Firm* — Anova Law Group, PLLC

(57) ABSTRACT

The present disclosure provides an optical apparatus including a light source for generating light, where the light includes a first polarized light of a first phase. The optical apparatus further includes an adjustment structure for changing a propagation path of the light. The adjustment structure includes a polarization beam splitting structure for reflecting the first polarized light.

12 Claims, 5 Drawing Sheets

OPTICAL DEVICE

CROSS-REFERENCE TO RELATED APPLICATION

This application claims the priority of Chinese Patent Application No. 201811653759.4, filed with the State Intellectual Property Office of P. R. China on Dec. 29, 2018, the entire content of which is incorporated herein by reference.

TECHNICAL FIELD

The present disclosure relates to an optical apparatus.

BACKGROUND

With the rapid development of electronic technology, various electronic devices, such as optical apparatuses, are widely used in daily life or work scenarios. For example, a head-mounted display device can be used to generate an image and provide it to a user for viewing. However, a conventional optical apparatus has a low optical conversion efficiency in the process from the image generation to the image incident on the users' eyes. Also, the generated image has a low level of privacy. People other than the user of the optical apparatus can view the generated image.

Therefore, how to improve the optical efficiency and the level of privacy of optical apparatuses has become an urgent problem.

SUMMARY

In accordance with the disclosure, one aspect of the present disclosure provides an optical apparatus including a light source for generating light, where the light includes a first polarized light of a first phase. The optical apparatus further includes an adjustment structure for changing a propagation path of the light. The adjustment structure includes a polarization beam splitting structure for reflecting the first polarized light.

In accordance with the disclosure, another aspect of the present disclosure provides a wearable device including a light source for generating light, where the light includes a first polarized light of a first phase. The wearable device further includes an adjustment structure for changing a propagation path of the light. The adjustment structure includes a polarization beam splitting structure for reflecting the first polarized light.

The polarization beam splitting structure for reflecting the first polarized light in the optical apparatus or the wearable device, thereby improving the optical efficiency or the level of privacy of the optical apparatus or the wearable device.

DESCRIPTION OF THE DRAWINGS

To clearly understand the present disclosure and advantages thereof, the present disclosure is described below with reference to the accompany drawings, in which.

DETAILED DESCRIPTION

Figure 1:
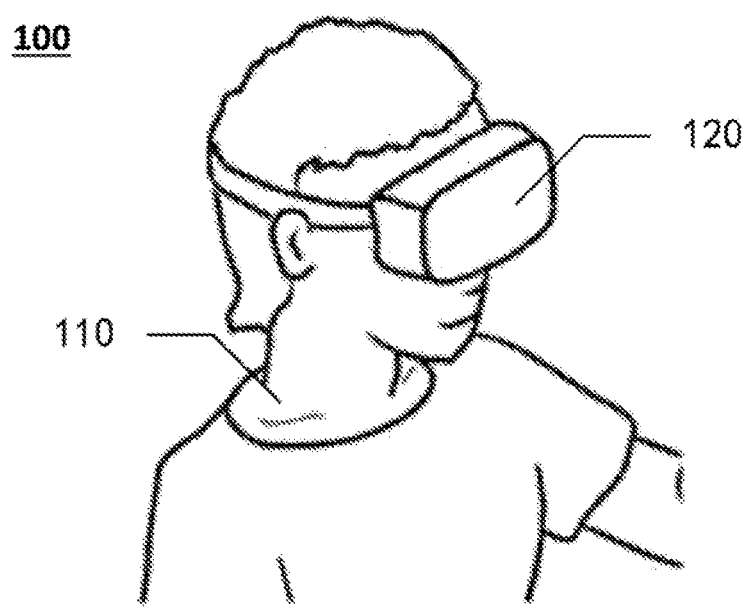
FIG. 1 schematically illustrates an application scenario of an optical apparatus according to an embodiment of the present disclosure.

Below describe embodiments of the present disclosure with reference to the accompanying drawings. It should be understood, however, that these descriptions are merely illustrative and are not intended to limit the scope of the present disclosure. In addition, in the following description, descriptions of well-known structures and techniques are omitted so as not to obscure the concept of the present disclosure.

Terms used herein are only for describing embodiments only but not intended to limit the present disclosure. The terms "including", "comprising", and the like, as used herein, indicate the presence of stated features, steps, operations, and/or components, but do not exclude the presence or addition of one or more other features, steps, operations, or components.

Unless otherwise defined, all the technical and scientific terms used herein have the same or similar meanings as generally understood by those skilled in the art. It should be noted that terms used herein should be interpreted as having meanings that are consistent with the context of the present specification and should not be interpreted in an idealized or overly rigid manner.

In terms of a statement similar to "at least one of A, B, and C, etc.," it should be generally interpreted in the light of the ordinary understanding of the expression by those skilled in the art (for example, "a system including at least one of A, B, and C" shall include, but is not limited to, a system including A alone, a system including B alone, a system including C alone, a system including A and B, a system including A and C, a system including B and C, and/or a system including A, B, and C, etc.). In terms of a statement similar to "at least one of A, B or C, etc.", it should generally be interpreted in the light of the ordinary understanding of the expression by those skilled in the art (for example, "a system including at least one of A, B or C" shall include, but is not limited to, a system including A alone, a system including B alone, a system including C alone, a system including A and B, a system including A and C, a system including B and C, and/or a system including A, B, and C, etc.). It should also be understood by those skilled in the art that all transitional words and/or phrases representing two or more alternative items, whether in the description, the claims or the drawings, should be understood as including one of these alternative items, or including any one of or all these alternative items. For example, the phrase "A or B" should be interpreted to include possibilities of including "A" or "B", or including "A" and "B".

The present disclosure provides an optical apparatus including a light source and an adjustment structure. The light source is configured to generate light, where the light includes first polarized light having a first phase. The adjustment structure is configured to change a propagation path of the light. The adjustment structure includes a polarization beam splitting structure, and the polarization beam splitting structure is configured to reflect the first polarized light.

In the technical solution of the embodiment of the present disclosure, the optical apparatus is provided with the polarization beam splitting structure for reflecting the first polarized light in the optical apparatus, thereby improving the optical efficiency or the level of privacy of the optical apparatus.

In order to make the present disclosure more clearly understood by those skilled in the technical field to which this application belongs, the technical solution of the present disclosure will be described in detail through specific embodiments with reference to the accompanying drawings.

FIG. 1 schematically illustrates an application scenario of an optical apparatus according to an embodiment of the present disclosure.

As shown in FIG. 1, an application scenario 100 of an embodiment of the present disclosure includes a user 110 and an optical apparatus 120.

According to the embodiment of the present disclosure, the optical apparatus 120 may be, for example, an electronic device capable of being worn on a body part, e.g., the head, of the user 110. The optical apparatus 120 may be, for example, a head mounted display (HMD). The HMD can isolate the user's vision and hearing from the outside world, thereby guiding the user to have a feeling of being in a virtual environment.

According to the embodiment of the present disclosure, the HMD can send optical signals to the eyes of the user 110, thereby achieving different effects such as virtual reality display (VR), augmented reality display (AR), and mixed reality display (MR).

Light is an electromagnetic wave, which is a transverse wave, and thus light propagates in a vibrating manner during a propagation process. A plane formed by a direction of the light's vibration and a direction of light's propagation is a vibration plane. If the vibration plane is limited to a certain fixed direction, the light in the fixed direction is polarized light. The polarized light includes, for example, two kinds of polarized light having different phases. For example, polarized light includes S-polarized light and P-polarized light.

The optical apparatus 120 according to the embodiment of the present disclosure includes, for example, a polarization beam splitting structure. The polarization beam splitting structure may be, for example, a polarization beam splitting prism or a polarization beam splitting film. The polarization beam splitting structure may polarize natural light that is polarized light, thereby converting the natural light into polarized light (for example, into S-polarized light or P-polarized light). In addition, the polarization beam-splitting structure may include twisted liquid crystal molecules, so that the polarization beam-splitting structure can control the passage of light. Therefore, the light transmittance and viewing angle range of the optical apparatus 120 can be improved, and the optical apparatus 120 can have, e.g., an anti-glare feature.

The optical apparatus 120 according to the embodiment of the present disclosure is capable of reflecting an optical signal to a user's eyes through a polarization beam splitting structure therein. For example, the polarization beam splitting structure can reflect S-polarized light in an optical signal. In other words, the embodiment of the present disclosure can use a polarization beam splitting structure to reflect S-polarized light in an optical signal to a user's eyes, thereby improving the optical efficiency of the optical apparatus. For example, the polarization beam splitting structure has a relative high reflection efficiency on S-polarized light, such that the brightness of light incident on the user's eyes is relatively high.

In the embodiment of the present disclosure, the polarization beam splitting structure has can reflect the S-polarized light in natural light and transmit the P-polarized light in natural light. The present disclosure does not limit a specific type of the polarization beam splitting structure, as long as the polarization beam splitting structure can have at least a function of reflecting the S-polarized light and transmitting the P-polarized light in natural light.

An optical apparatus according to an exemplary embodiment of the present disclosure is described below with reference to FIGS. 2-5 in conjunction with the application scenario of FIG. 1. The above application scenario is shown only for the convenience of understanding the spirit and principle of the present disclosure, but not for limiting the embodiments of the present disclosure. The embodiments of the present disclosure can be applied to any applicable scenario.

Figure 2:
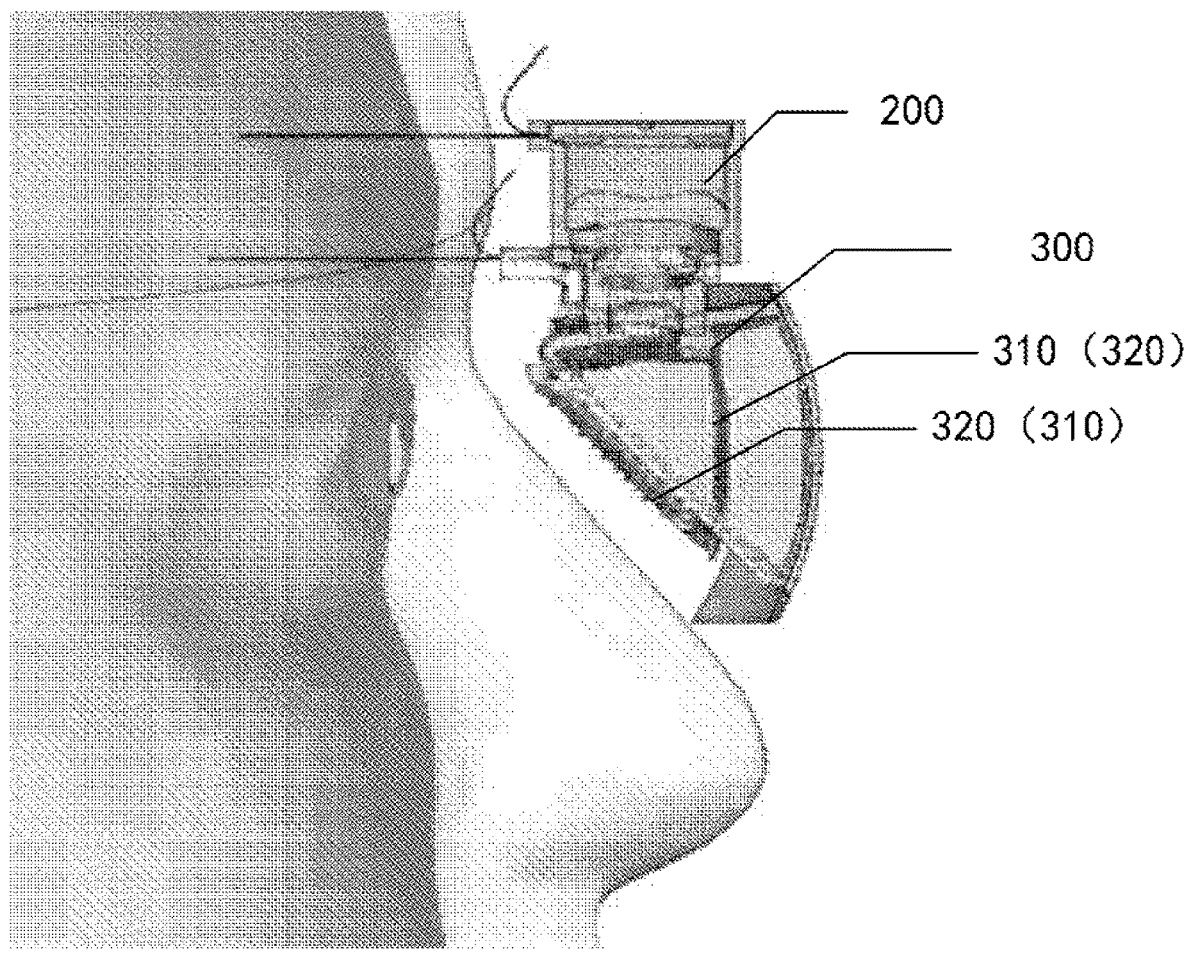
FIG. 2 schematically illustrates a structural diagram of an optical apparatus according to an embodiment of the present disclosure.

FIG. 2 schematically illustrates a structural diagram of an optical apparatus according to an embodiment of the present disclosure.

As shown in FIG. 2, an optical apparatus according to an embodiment of the present disclosure includes a light source 200 and an adjustment structure 300.

According to an embodiment of the present disclosure, the light source 200 is configured to generate light, and the light includes a first polarized light having a first phase.

The light source 200 can generate light, and the light can be projected on a display to form a visible image. The light source 200 may be a liquid crystal display (LCD), an organic light emitting diode (OLED), a device with a new reflective projection technology, e.g., liquid crystal on silicon (LCOS), or a device that generates light through a conductive method using, e.g., an optical fiber. The light generated by the light source 200 may be, for example, natural light. The natural light includes, for example, a first polarized light having a first phase, and the natural light may further include a second polarized light having a second phase, where the first phase is different from the second phase. The first polarized light in the embodiment of the present disclosure may be S-polarized light, and the second polarized light may be P-polarized light.

In the embodiment of the present disclosure, the adjustment structure 300 is configured to change a propagation path of the light.

In the embodiment of the present disclosure, the adjustment structure 300 is, for example, a reflective structure (optical-mechanical structure) in the optical apparatus. The adjustment structure 300 can change the propagation path of the light by reflecting the light from the light source 200. That is, the adjustment structure 300 of the embodiment of the present disclosure can change the light generated from the light source 200, and after the propagation path is changed, the light can be incident on the user's eyes, so that the user can view the image formed by the light.

The adjustment structure 300 includes a polarization beam splitting structure 310, and the polarization beam splitting structure 310 is configured to reflect the first polarized light.

In the embodiment of the present disclosure, the adjustment structure 300 includes at least, for example, the polarization beam splitting structure 310.

According to the embodiment of the present disclosure, the polarization beam splitting structure 310 may be, for example, a polarization beam splitting prism or a polarization beam splitting film. The polarization beam splitting structure 310 can reflect S-polarized light in natural light and transmit P-polarized light in natural light. In the embodiment of the present disclosure, the polarization beam splitting structure 310 in the adjustment structure 300 is configured to, at least, reflect the S-polarized light in the light or transmit the P-polarized light in the light.

According to the embodiment of the present disclosure, the adjustment structure 300 further includes a plate 320 for converting the first polarized light into the second polarized light, or for converting the second polarized light into the first polarized light.

In the embodiment of the present disclosure, the plate 320 in the adjustment structure 300 is, for example, a quarter-wave plate (QWP), and the QWP is a birefringent single crystal film with a certain thickness. The QWP can be used to change the phase of the first polarized light or the phase of the second polarized light in the light. For example, the QWP can change the phase of S-polarized light or the phase of the P-polarized light and convert them into each other. For example, the QWP can convert the S-polarized light into the P-polarized light, or the P-polarized light into the S-polarized light.

In the embodiment of the present disclosure, the polarization beam-splitting structure 310 and the plate 320 may be arranged opposite to each other. For example, the light generated by the light source 200 may first reach the polarization beam splitting structure 310, and then the light can be reflected by the polarization beam splitting structure 310 to the plate 320 arranged opposite to the polarization beam splitting structure 310. In another example, the light generated by the light source 200 may first reach the plate 320, and the phase of the light passing through the plate 320 may be changed. Further, the light after the phase is changed may reach the polarization beam splitting structure 310 arranged opposite to the plate 320.

The embodiment of the present disclosure does not limit a specific type of the plate 320. The plate 320 is, for example, a QWP, or may be another type of plate, as long as the plate can convert the S-polarized light to the P-polarized light, or convert the P-polarized light to the S-polarized light. Those skilled in the art can determine the type of the plate 320 according to the actual application situation.

The plate 320 may not be a necessary structure in the adjustment structure 300. That is, the adjustment structure 300 in some embodiments may include the plate 320, and the adjustment structure 300 in other embodiments may not include the plate 320. For example, the adjustment structure 300 described in the embodiments in FIG. 3 and FIG. 4 below may include the plate 320, and the adjustment structure 300 described in the embodiment in FIG. 5 may not include the plate 320.

In the technical solution implemented in the present disclosure, by providing a polarization beam splitting structure in an optical apparatus, the optical apparatus can reflect light to a user's eyes through the polarization beam splitting structure. For example, the optical apparatus can reflect the S-polarized light in the optical signal to the user's eyes through the polarization beam splitting structure, which can improve the optical efficiency of the optical apparatus. This is because the polarization beam splitting structure has a high reflection efficiency for S-polarized light, so that the brightness of light incident on the user's eyes is large.

Figure 3:
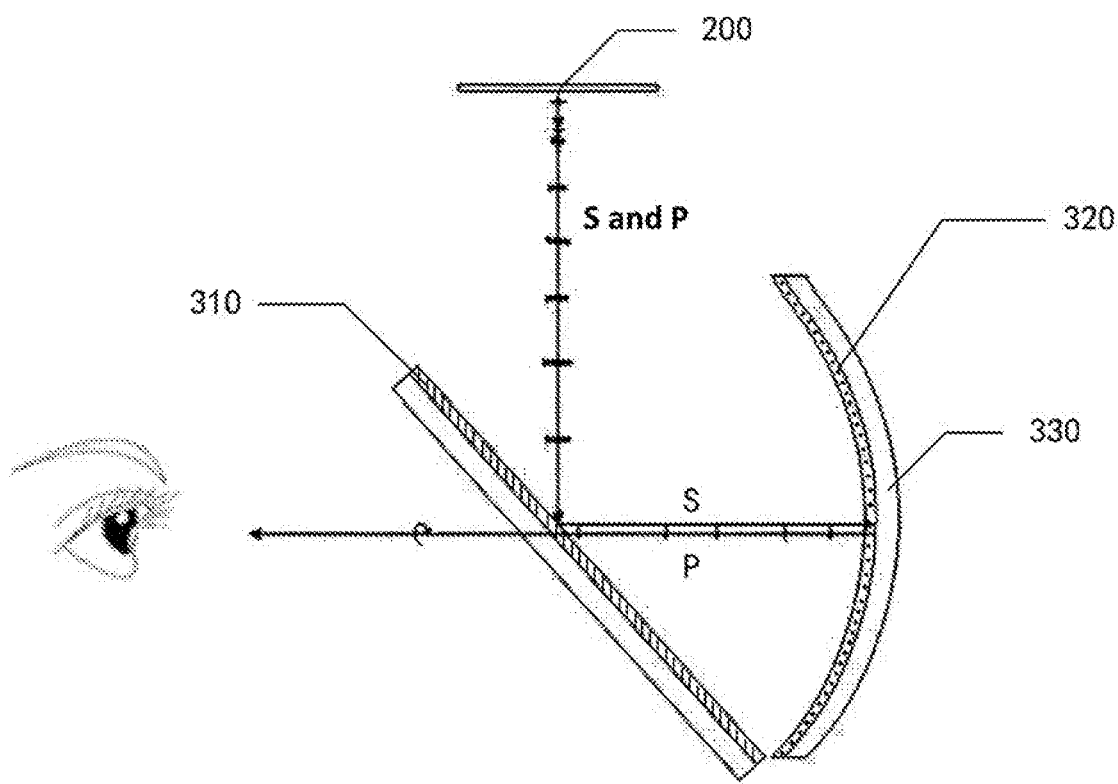
FIG. 3 schematically illustrates a structural diagram of an optical apparatus according to an embodiment of the present disclosure.

FIG. 3 schematically illustrates a structural diagram of an optical apparatus according to an embodiment of the present disclosure.

As shown in FIG. 3, the polarization beam splitting structure 310 of the optical apparatus according to the embodiment of the present disclosure may be disposed below the light source 200 and disposed at an inclined angle with respect to the light source 200. The polarization beam splitting structure 310 in this configuration can receive light from the light source 200 and reflect the first polarized light (S-polarized light) in the light. The plate 320 according to the embodiment of the present disclosure may be, e.g., a curved structure. The plate 320 is arranged opposite to one side of the polarization beam splitting structure 310. The plate 320 in this configuration can receive the first polarized light (the S-polarized light) reflected from the polarization beam splitting structure 310.

According to the embodiment of the present disclosure, the first polarized light is reflected by the polarization beam splitting structure 310 to obtain the reflected first polarized light.

In the embodiment of the present disclosure, the light generated by the light source 200 first reaches the polarization beam splitting structure 310, and the polarization beam splitting structure 310 reflects the S polarized light in the light to obtain the reflected S polarized light, and the reflected S polarized light can continue to be incident on the QWP arranged opposite to the polarization beam splitting structure 310.

The polarization beam splitting structure 310 can transmit the P-polarized light in the light. In other words, after the light emitted from the light source 200 passes through the polarization beam splitting structure 310, only S-polarized light is left (reflected), and the reflected S polarization beam can continue to reach the plate 320 that is arranged opposite to the polarization beam splitting structure 310. The P-polarized light transmitted from the polarization beam splitting structure 310 does not reach the plate 320.

The plate 320 is used to convert the first polarized light reflected by the polarization beam splitting structure 310 into the second polarized light.

In the embodiment of the present disclosure, the phase of the S-polarized light reflected by the polarization beam splitting structure 310 to the QWP is changed after passing through the QWP. For example, the phase of the S-polarized light is changed after passing through a QWP to obtain the P-polarized light. The P-polarized light can enter the polarization beam splitting structure 310 again.

The polarization beam splitting structure 310 is further configured to transmit the converted second polarized light, so that the transmitted second polarized light can be incident on the user's eyes.

For example, after the P-polarized light obtained through the conversion of the QWP reaches the polarization beam splitting structure 310 again, the P-polarized light can pass through the polarization beam splitting structure 310 and enter the user's eye, so that the user can view the image formed by the light.

In the embodiment of the present disclosure, the adjustment structure 300 further includes a reflective structure 330. The reflective structure 330 is disposed at a side of the plate 320 that is away from the polarization beam splitting structure, and is configured to reflect the second polarized light obtained by the conversion of the plate 320.

According to the embodiment of the present disclosure, the reflective structure 330 may be, for example, a reflective film. The reflective film may be a structure having a large extinction coefficient. The reflective film can realize that when light is incident on the reflective film, the amplitude of the light is rapidly attenuated, so that the light energy entering the reflective film is correspondingly reduced, and the light energy reflected by the reflective film is thus increased.

The reflective film is, for example, attached (or coated) on the side of the glass sheet 320 that is away from the polarization beam splitting structure. After the plate 320 converts the S-polarized light from the polarization beam splitting structure 310 into the P-polarized light, the reflective structure 330 (reflective film) reflects the P-polarized light, and the reflected P-polarized light can enter the polarization beam splitting structure 310 again. The polarization beam splitting structure 310 enables the P-polarized light that reaches the polarization beam-splitting structure 310 again to be transmitted by the polarization beam-splitting structure 310 to reach the user's eyes.

The optical apparatus according to the embodiment of the present disclosure can achieve high optical efficiency. In the process that the light is emitted from the light source 200, the light is then reflected by the adjustment structure 300, and reaches the user's eyes. The adjustment structure 300 only causes the loss of the brightness of the light twice. The first brightness loss is that after the light (including the S-polarized light and the P-polarized light) emitted from the light source 200 to the polarization beam splitting structure 310, the brightness of the P-polarized light in the light is reduced when the P-polarized light is transmitted by the polarization beam splitting structure 310 (the brightness of S-polarized light that is reflected by the polarization beam splitting structure 310 has almost no loss). The second brightness loss is that the brightness loss in the process of the converted P-polarized light being reflected by the reflective structure 330 (e.g., the reflective film). In other words, the adjustment structure 300 only causes the loss of the brightness of light twice, so that optical apparatus can have a high optical efficiency.

For example, assuming that the light efficiency is 100% after the light is emitted from the light source 200, and the loss rates of both losses are, for example, 50%, the optical efficiency of the optical apparatus may be approximately 100%*50%*50%=25%.

In the embodiment of the present disclosure, the reflective structure 330 (such as a reflective film) may be, for example, an opaque or poorly transparent structure, so as to ensure that optical information that is leaked out of the optical apparatus is as little as possible, and to avoid other user from viewing the image in the optical apparatus to improve the level of privacy of the optical apparatus.

Figure 4:
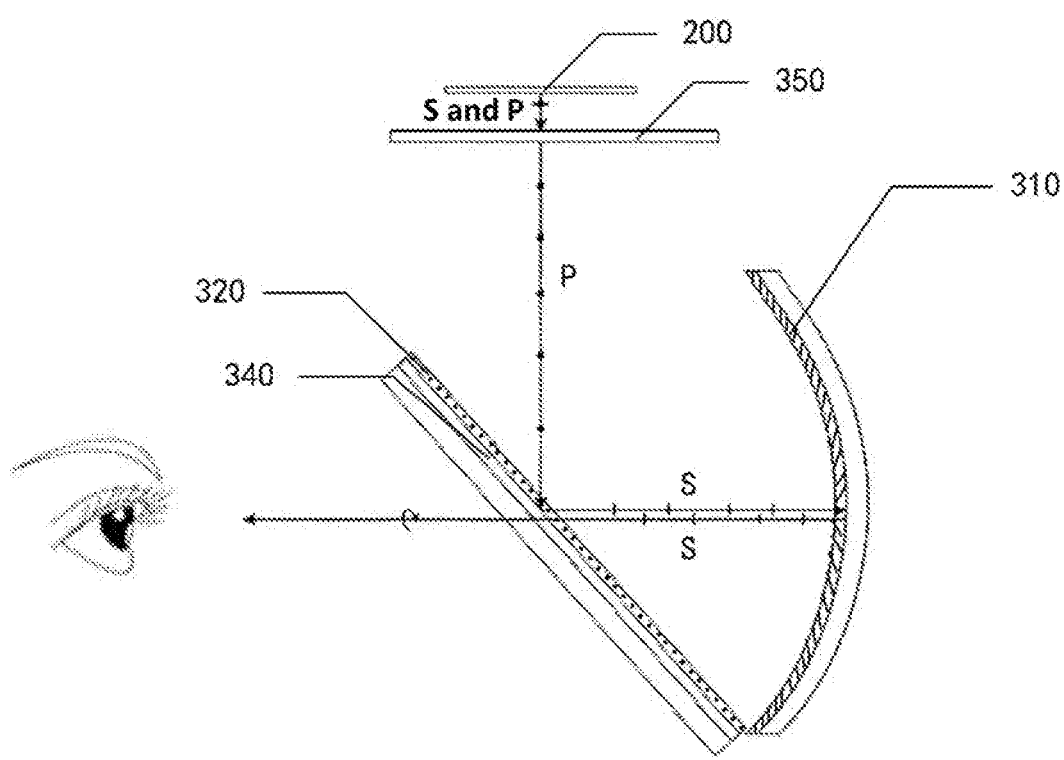
FIG. 4 schematically illustrates a structural diagram of an optical apparatus according to another embodiment of the present disclosure.

FIG. 4 schematically illustrates a structural diagram of an optical apparatus according to another embodiment of the present disclosure.

As shown in FIG. 4, the plate 320 of the optical apparatus according to the embodiment of the present disclosure is, for example, disposed below the light source 200 and is disposed at an inclined angle with respect to the light source 200. The plate 320 in this configuration can receive the light generated from the light source 200 and can change the phase of the light (for example, the phase of the P-polarized light is changed through the plate 320 to obtain S-polarized light). The polarization beam splitting structure 310 in the embodiment of the present disclosure may be, for example, a curved surface structure. The polarization beam splitting structure 310 may be arranged opposite to one side of the plate 320. The polarization beam splitting structure 310 in this configuration can receive and reflect the optical signal (e.g., the S-polarized light) after the phase of the light is changed by the plate 320.

The optical apparatus according to the embodiment of the present disclosure includes, for example, a first polarizer 350. The first polarizer 350 is configured to receive a second polarized light in the light and guide the second polarized light to the plate 320.

In the embodiment of the present disclosure, the first polarizer 350 may be, for example, a polarizing lens, and the polarizing lens may be a color filter. The color-removal function of the polarizing lens can selectively allow light that vibrates in a certain direction, for example, S-polarized light or P-polarized light in natural light, to pass through.

In the embodiment of the present disclosure, the first polarizer 350 can be used to filter, for example, S-polarized light or P-polarized light from the light generated from the light source 200. As illustrated in FIG. 4, the light generated by the light source 200 first passes through the first polarizer 350. The first polarizer 350 filters, for example, the S-polarized light in the light and retains the P-polarized light. The P-polarized light can be incident on the plate 320 (for example, a QWP) located below the first polarizer 350.

According to the embodiment of the present disclosure, the plate 320 is used for receiving the second polarized light in the light, and converting the second polarized light into the first polarized light.

For example, the P-polarized light passing through the first polarizer 350 can be incident on a QWP located below the first polarizer 350. The QWP can change the phase of the received P-polarized light to obtain S-polarization. The S-polarized light can continue to reach the polarization beam splitting structure 310 that is arranged opposite to the QWP.

In the embodiment of the present disclosure, the polarization beam splitting structure 310 is configured to reflect the first polarized light incident from the plate to obtain the reflected first polarized light.

For example, the S-polarized light reaching the polarization beam splitting structure 310 from the QWP is reflected by the polarization beam splitting structure 310. That is, the S-polarized light reflected by the polarization beam splitting structure 310 can pass through the QWP again and be incident on the eyes of the user.

According to the embodiment of the present disclosure, the adjustment structure 300 further includes a first transflective structure 340. The first transflective structure 340 is disposed at a side close to the plate 320 that is away from the polarization beam splitting structure 310, and is configured to reflect the first polarized light that is converted by the plate 320 to the polarization beam splitting structure 310.

According to the embodiment of the present disclosure, the first transflective structure 340 is, for example, a pellicle mirror. The pellicle mirror includes, for example, a reflective film. That is, the effect of the pellicle mirror on light is half transmission and half reflection. The pellicle mirror has a low light absorption, and the pellicle mirror can thus have better optical performance.

For example, the first transflective structure 340 can be stacked on the plate 320. The first transflective structure may be disposed at a side close to the plate 320 that is away from the polarization beam splitting structure 310. For example, the plate 320 may be attached on the first transflective structure 340. In the embodiment of the present disclosure, after the P-polarized light from the light source 200 is converted into the S-polarized light through the plate 320, the S-polarized light can be reflected to the polarization beam splitting structure 310 through the first transflective structure 340 disposed on the plate 320.

In the embodiment of the present disclosure, the first polarized light reflected by the polarization beam splitting structure 310 is transmitted through the plate 320 and the first transflective structure 340 and is incident on the user's eyes. That is, the S-polarized light reflected by the polarization beam splitting structure 310 can pass through the QWP again, and the P-polarized light is obtained by change the phase of the S-polarized light. The P-polarized light can pass through the first transflective layer which is stacked on the plate 320 and then is incident on the user's eyes.

The optical structure of the embodiment of the present disclosure can realize that the light reaching the polarization beam splitting structure 310 can be only S-polarized light, and the polarization beam splitting structure 310 can reflect the S-polarized light, so as to preventing the S-polarized light from leaking outside the optical apparatus through the polarization beam splitting structure 310. That is, the optical structure of the embodiment of the present disclosure can ensure that the optical signal that is leaked out of the optical apparatus is as little as possible, so as to prevent other users from viewing the image in the optical apparatus, thereby improving the level of privacy of the optical apparatus.

Figure 5:
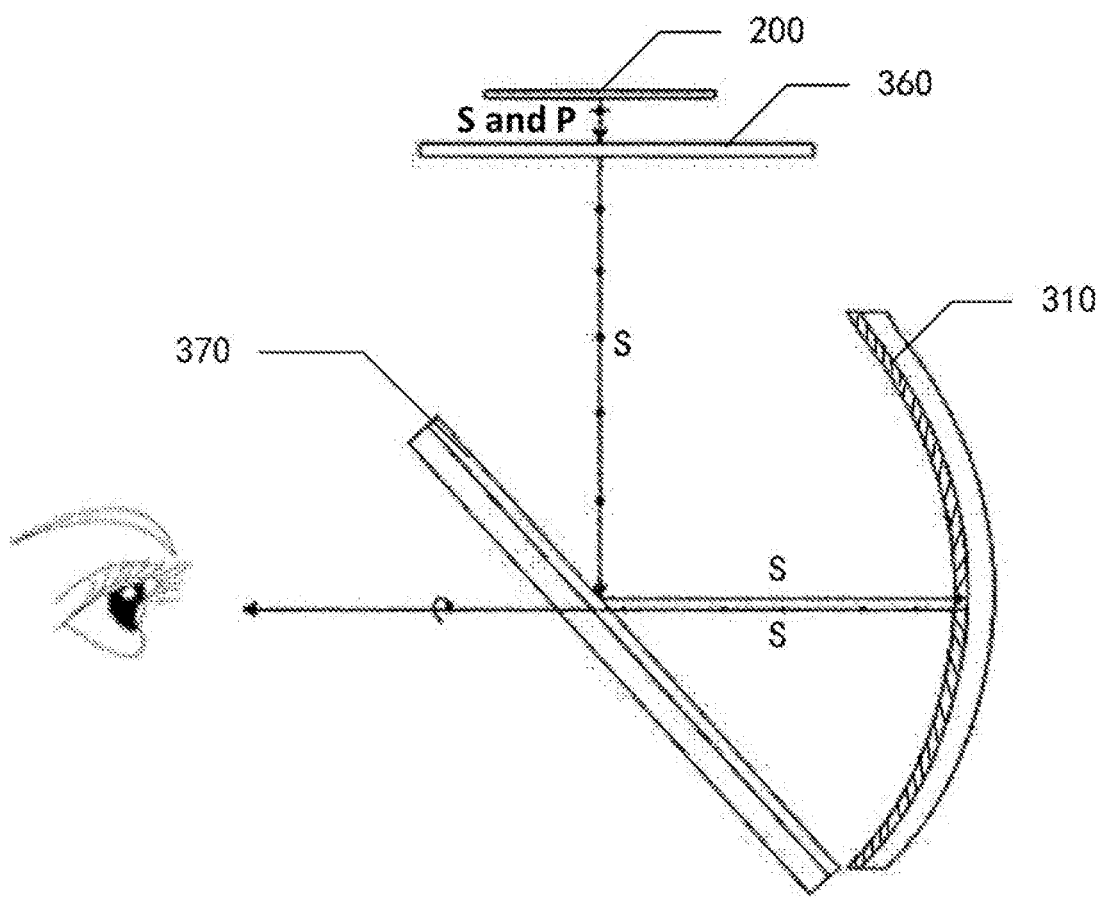
FIG. 5 schematically illustrates a structural diagram of an optical apparatus according to another embodiment of the present disclosure.

FIG. 5 schematically illustrates a structural diagram of an optical apparatus according to another embodiment of the present disclosure.

As shown in FIG. 5, the adjustment structure 300 according to the embodiment of the present disclosure includes a second polarizer 360 and a second transflective structure 370.

The second polarizer 360 is configured to receive the first polarized light in the light.

In the embodiment of the present disclosure, the second polarizer 360 may be the same as or similar to the first polarizer 350 in the embodiment described in FIG. 4. That is, the second polarizer 360 may be, for example, a polarizing lens, and the polarizing lens may be a color filter. The color-removal function of the polarizing lens can selectively allow light that vibrates in a certain direction, for example, S-polarized light or P-polarized light in natural light, to pass through.

In the embodiment of the present disclosure, the second polarizer 360 can be used to filter S-polarized light or P-polarized light in the light, for example. As illustrated in FIG. 5, the light generated by the light source 200 can first pass through the second polarizer 360, which can filter the P-polarized light in the light and retain the S-polarized light. The retained S-polarized light can be directed to the second transflective structure 370.

According to the embodiment of the present disclosure, the second transflective structure 370 is configured to reflect the first polarized light that is received by the second polarizer 360 to the polarization beam splitting structure 310.

According to the embodiment of the present disclosure, the second transflective structure 370 may be same as or similar to the first transflective structure 340 in the embodiment described in FIG. 4. That is, the second transflective structure 370 may be, for example, a pellicle mirror. The pellicle mirror includes, for example, a reflective film. That is, the effect of the pellicle mirror on light is half transmission and half reflection. The pellicle mirror has a low light absorption characteristic, and the pellicle mirror can thus have better optical performance.

The second transflective structure 370 can receive S-polarized light emitted from the light source 200, and the second transflective structure 370 can reflect the S-polarized light to the polarizing beam splitting structure 310 that is arranged opposite to the S-polarized light.

The second transflective structure 370 of the embodiment of the present disclosure is, for example, disposed below the light source 200 and disposed at an inclined angle with respect to the light source 200. The second transflective structure 370 at this configuration can receive and reflect the light from the light source 200. For example, the second transflective structure 370 can receive and reflect the S-polarized light. The polarization beam splitting structure 310 in the embodiment of the present disclosure may be, for example, a curved surface structure. The polarization beam splitting structure 310 is disposed opposite to one side of the second transflective structure 370, and the polarization beam splitting structure 310 in this configuration can receive the light reflected by the second transflective structure 370 (e.g., the S-polarized light).

The polarization beam splitting structure 310 in the embodiment of the present disclosure is configured to reflect the first polarized light from the second transflective structure 370. That is, after being reflected through the polarization beam splitting structure 310, the S-polarized light from the second transflective structure 370 can reach the second transflective structure 370 again.

The first polarized light reflected by the polarization beam splitting structure 310 is incident on the user's eye through the second transflective structure 370. That is, when the S-polarized light is reflected by the polarization beam splitting structure 310 and reaches the second transflective structure 370 again, the S-polarized light can be transmitted through the second transflective structure 370 and be incident on the user's eyes.

The optical structure of the embodiment of the present disclosure can realize that the light reaching the polarization beam splitting structure 310 can be only S-polarized light, and the polarization beam splitting structure 310 can reflect the S-polarized light, so as to preventing the S-polarized light from leaking outside the optical apparatus through the polarization beam splitting structure 310. That is, the optical structure of the embodiment of the present disclosure can ensure that the optical signal that is leaked out of the optical apparatus is as little as possible, so as to prevent other users from viewing the image in the optical apparatus, thereby improving the level of privacy of the optical apparatus.

Those skilled in the art should understand that the features described in embodiments and/or claims of the present disclosure can be combined in various manners, even though such combinations are not explicitly described in the present disclosure. In particular, various combinations of features described in various embodiments and/or claims of the present disclosure may be made without departing from the spirit and teaching of the present disclosure. All these combinations shall fall within the scope of the present disclosure.

Although the present disclosure has been shown and described with reference to specific exemplary embodiments thereof, it will be understood by those skilled in the art that without departing from the spirit and scope of the present disclosure defined by the appended claims and their equivalents, various modifications in form and detail may be made to the present disclosure. Therefore, the scope of the present disclosure should not be limited to the above-described embodiments but should be determined not only by the appended claims but also by the equivalents of the appended claims.

What is claimed is:

1. An optical apparatus, comprising:
   a light source, configured to generate light, the light comprising a first polarized light having a first phase and a second polarized light having a second phase, the first phase being different from the second phase;
   an adjustment structure, configured to change a propagation path of the light and including:
   a plate configured to convert the second polarized light into converted first polarized light;

a polarization beam splitting structure configured to reflect the converted first polarized light from the plate to obtain reflected first polarized light; and an opaque structure disposed at a side of the polarization beam splitting structure that is away from the plate and configured to avoid transmission of light from surrounding environment to the plate; and a polarizer configured to receive the second polarized light in the light and guide the second polarized light to the plate.

2. The optical apparatus according to claim 1, wherein:
the plate includes a quarter-wave plate.

3. The optical apparatus according to claim 1, wherein:
the plate is disposed inclined with respect to a direction of the light emitted from the light source; and
the polarization beam splitting structure has a curved structure.

4. The optical apparatus according to claim 1, wherein:
the adjustment structure further includes a transflective structure disposed at a side of the plate that is away from the polarization beam splitting structure and being configured to reflect the converted first polarized light by the plate to the polarization beam splitting structure.

5. The optical apparatus according to claim 4, wherein the reflected first polarized light by the polarization beam splitting structure is transmitted through the plate and the transflective structure to be incident on a user's eyes.

6. The optical apparatus according to claim 4, wherein:
the transflective structure includes a pellicle mirror.

7. The optical apparatus according to claim 1, wherein:
the polarizer includes a color filter to selectively allow light vibrates in one direction to pass through.

8. An optical apparatus comprising:
a light source configured to generate light, the light comprising a first polarized light having a first phase and a second polarized light having a second phase, the first phase being different from the second phase; and
an adjustment structure configured to change a propagation path of the light and including:
a transflective structure configured to reflect the first polarized light;
a polarization beam splitting structure configured to further reflect the first polarized light from the transflective structure; and
an opaque structure disposed at a side of the polarization beam splitting structure that is away from the transflective structure and configured to avoid transmission of light from surrounding environment to the transflective structure; and
a polarizer configured to receive the first polarized light in the light and guide the first polarized light to the transflective structure.

9. The optical apparatus according to claim 8, wherein:
the polarizer includes a color filter to selectively allow light vibrates in one direction to pass through.

10. The optical apparatus according to claim 8, wherein:
the transflective structure includes a pellicle mirror.

11. A wearable device, comprising:
a light source, configured to generate light, the light comprising a first polarized light having a first phase and a second polarized light having a second phase, the first phase being different from the second phase;
an adjustment structure, configured to change a propagation path of the light and including:
a plate configured to convert the second polarized light into converted first polarized light;
a polarization beam splitting structure configured to reflect the converted first polarized light from the plate to obtain reflected first polarized light; and
an opaque structure disposed at a side of the polarization beam splitting structure that is away from the plate and configured to avoid transmission of light from surrounding environment to the plate; and
a polarizer configured to receive the second polarized light in the light and guide the second polarized light to the plate.

12. The optical apparatus according to claim 8, wherein:
the first polarized light reflected by the polarization beam splitting structure is incident on a user's eyes after passing through the transflective structure.

* * * * *